United States Patent

Zolotoochin et al.

[11] Patent Number: 5,753,200
[45] Date of Patent: May 19, 1998

[54] SODIUM METABISULFITE PROCESS

[75] Inventors: Vladimir M. Zolotoochin, The Woodlands, Tex.; Jim P. Metziner; David M. Hansen, both of Green River, Wyo.

[73] Assignee: Solvay Minerals, Inc., Houston, Tex.

[21] Appl. No.: 726,677

[22] Filed: Oct. 7, 1996

[51] Int. Cl.$^6$ ..................................................... C01D 5/14
[52] U.S. Cl. ......................... 423/519; 423/517; 423/184
[58] Field of Search ............................ 423/184, 517, 423/519

[56] References Cited

U.S. PATENT DOCUMENTS

| | | | |
|---|---|---|---|
| 1,484,818 | 2/1924 | Drewsen | 423/519.2 |
| 2,277,778 | 3/1942 | Randall | 423/519 |
| 2,656,249 | 10/1953 | Gray et al. | 23/130 |
| 2,862,887 | 12/1958 | Boyer | 252/183 |
| 3,361,524 | 1/1968 | Spormann et al. | 23/129 |
| 3,369,866 | 2/1968 | Spormann et al. | 23/114 |
| 3,615,198 | 10/1971 | Terrana et al. | 23/178 |
| 3,630,668 | 12/1971 | Wright et al. | 23/103 |
| 3,649,182 | 3/1972 | Miller et al. | 23/137 |
| 3,653,812 | 4/1972 | Schneider et al. | 23/25 Q |
| 3,719,742 | 3/1973 | Terrana et al. | 423/242 |
| 3,860,695 | 1/1975 | Metzger et al. | 423/519 |
| 3,995,015 | 11/1976 | Bean | 423/519 |
| 4,112,061 | 9/1978 | Hoffmann et al. | 423/512 A |
| 4,177,244 | 12/1979 | Neumann et al. | 423/242 |
| 4,206,187 | 6/1980 | Parish | 423/242 |
| 4,844,880 | 7/1989 | Bean et al. | 423/519 |

FOREIGN PATENT DOCUMENTS

| | | | |
|---|---|---|---|
| 2534571 | 4/1984 | France | 423/519 |
| 373254 | 3/1973 | U.S.S.R. | 423/519 |
| 1724575 | 4/1992 | U.S.S.R. | 423/519 |

OTHER PUBLICATIONS

Seidell "Solubilities, Inorganic and Metal–Organic Compounds K–Z" vol. II, 4th Ed. USA, American Chemical, 1965, no month.
Society, Lib. Congress Catalog Card A59–3563.

Primary Examiner—Gary P. Straub
Assistant Examiner—Timothy C. Vanoy
Attorney, Agent, or Firm—Brinks Hoffer Gilson & Lione

[57] ABSTRACT

Sulfur dioxide is introduced into a solution of sodium sulfite and sodium bisulfite to form sodium bisulfite in a solution having dissolved sulfur dioxide present with a pH between 3.5 and 4.2. The solution is drawn to a cooling crystallizer where sodium hydroxide is added to produce additional sodium metabisulfite that increases the yield of sodium metabisulfite crystallizing per pass. The mother liquor is recycled.

21 Claims, 2 Drawing Sheets

SODIUM METABISULFITE PROCESS

BACKGROUND OF THE INVENTION

The present invention relates to a process for the manufacture of crystalline sodium metabisulfite. More specifically, the invention relates to an improved process for manufacturing sodium metabisulfite that is able to achieve a higher quality product and also increased yield per pass in comparison with existing processes.

Sodium metabisulfite has the following chemical formula: $Na_2S_2O_5$. It is also known, less commonly, as sodium pyrosulfite. Sodium metabisulfite has a variety of commercial uses such as a disinfectant or bleach for fabrics and paper. It is also used as a preservative in food.

Sodium metabisulfite is typically made by crystallizing it from a solution of sodium bisulfite, $NaHSO_3$. Under certain conditions, when a solution of sodium bisulfite is cooled, two sodium bisulfite molecules react with itself to produce a molecule of sodium metabisulfite as a crystal and water.

The sodium bisulfite can be prepared in a number of ways. Commonly, sodium bisulfite is made by reacting sulfur dioxide gas, $SO_2$, in a solution containing sodium hydroxide, NaOH, or sodium carbonate, $Na_2CO_3$. Also, under certain conditions, this reaction can produce sodium sulfite, $Na_2SO_3$. However, by reacting additional sulfur dioxide gas into a solution of sodium sulfite, sodium bisulfite can be produced.

Although a variety of process schemes have been developed for producing sodium metabisulfite, these different processes are not without some disadvantages For example, often the sodium metabisulfite product has a distinctive "rotten egg" odor from the use of sulfur dioxide gas. Also, the sodium metabisulfite product, which is in a crystalline form, often has crystals that are too small and dusty that creates handling difficulties. Sodium metabisulfite crystallizers can be quite sensitive to many disturbances that can result in a shower of unusable fines. Furthermore, because this product is a crystal, some processes have slurries of crystals being pumped from vessel to vessel This requires more expensive equipment than would otherwise be needed if just liquids were being pumped.

To overcome this last problem, some processes complete the reactions in one vessel and crystallize the product in another vessel. However, separating the two process steps limits the optimum use of the plant equipment resulting in lower product yields.

SUMMARY OF THE INVENTION

The process of this invention improves upon the processes currently known for making sodium metabisulfite. This process makes sodium metabisulfite crystals larger and stronger with reduced odor problems. Also, this process utilizes plant equipment more efficiently by maximizing the yield of sodium metabisulfite.

The process involves dissolving sodium carbonate in a mother liquor recycle stream containing sodium bisulfite to prepare a feed liquor. The feed liquor and sulfur dioxide gas are introduced into a contacting tower producing a reaction liquor of sodium bisulfite close to saturation with dissolved sulfur dioxide present where the reaction liquor is maintained at a pH in the range of about 3.5 to about 4.2 and at a temperature of about 100° to about 160° F. The reaction liquor is then introduced into a separate vessel, where sodium hydroxide is added to react with the dissolved sulfur dioxide to produce additional sodium bisulfite while simultaneously this liquor is cooled to a temperature between about 115° and about 50° F. to crystallize sodium metabisulfite. The additional reaction producing sodium bisulfite while crystallizing results in improvements of crystallization yield per pass, thereby producing greater amounts of product in the same equipment.

DETAILED DESCRIPTION OF THE PRESENTLY PREFERRED EMBODIMENTS

Overview

The improved process for making sodium metabisulfite can achieve greater product yields per pass and a better quality product by taking advantage of a distributive reaction process flow scheme. The chemical reactions needed to produce sodium metabisulfite are conducted in separate vessels. The overall reaction is distributed between several vessels so that aspects can be individually optimized by controlling individual flow streams, pHs and temperatures. Likewise, the vessels can be sized for optimum conditions unique to the particular chemical reaction, minimizing capital costs.

Figure 1:
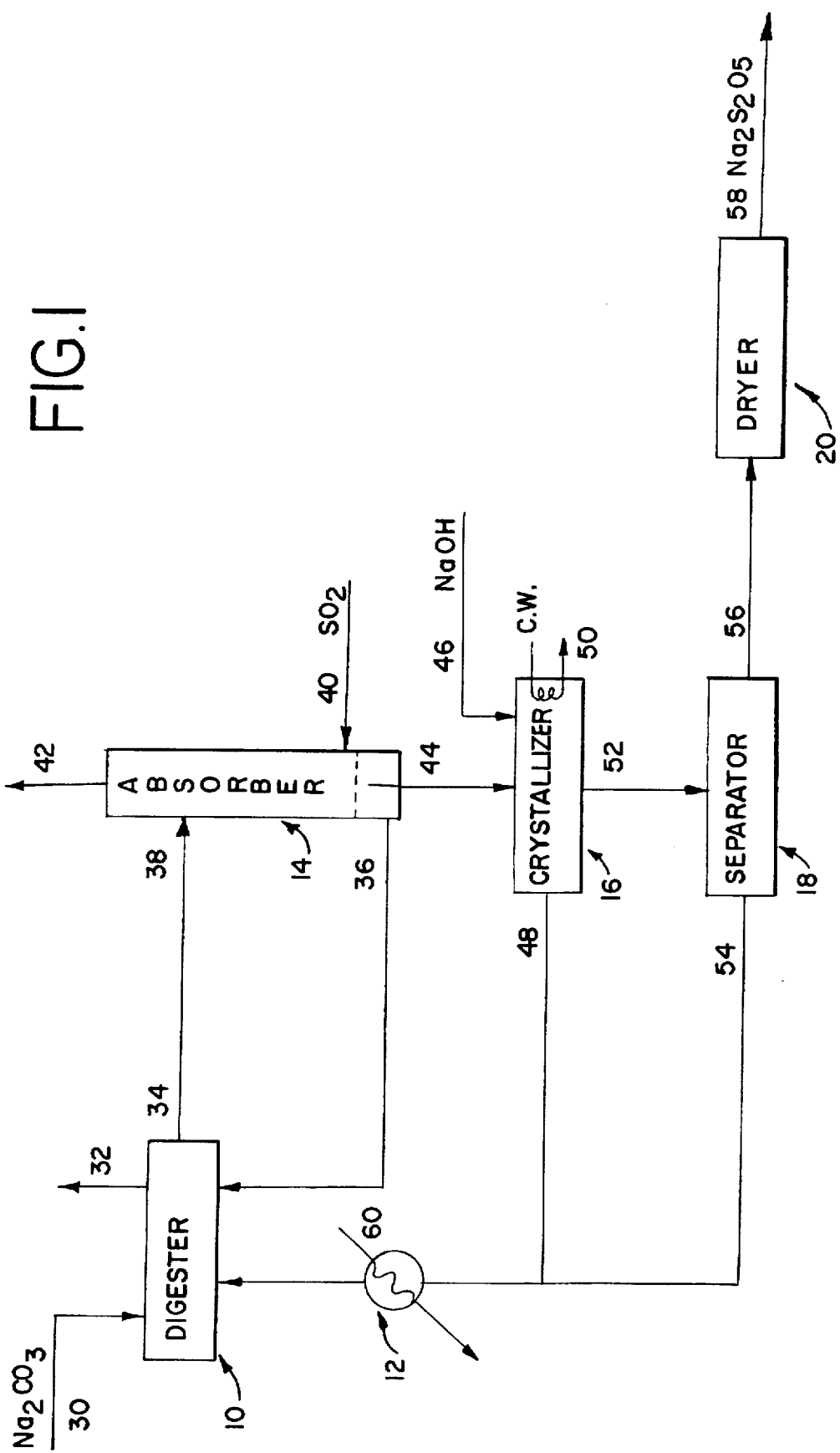
FIG. 1 depicts a block flow diagram for one embodiment of the process to produce sodium metabisulfite.

As shown in FIG. 1, one embodiment of this invention is a process where soda ash is introduced into a recycle mother liquor stream in a digester 10 to form a solution of sodium sulfite and sodium bisulfite. This resultant feed liquor is introduced through line 38 into an absorber 14 where sulfur dioxide is introduced and forms a reaction liquor containing sodium bisulfite close to saturation and dissolved sulfur dioxide. The reaction liquor is passed through line 44 into a crystallizer 16 where the solution is cooled to crystallize sodium metabisulfite, while at the same time, caustic soda is added to react with the sulfur dioxide and form additional sodium bisulfite. The mother liquor overflow is recycled through line 48 to the digester 10 and the crystal slurry is passed through line 52 to a separator 18. In separator 18, additional mother liquor is removed from the slurry and recycled through line 54 back to digester 10. The crystals from separator 18 are passed to a dryer 20 to make the sodium metabisulfite crystal product.

Even though caustic soda is reacting with sulfur dioxide at the same time that sodium metabisulfite is crystallizing, it was surprisingly found that the sodium metabisulfite product obtained by this process generally has coarse crystal structure with at least about 70% by weight being coarser than 100 mesh. Therefore, greater yields of good quality crystals can be produced. Also, the product does not have the characteristic sulfur dioxide odor.

Crystallizer Feed Preparation

Soda ash 30 and a recycle stream of crystallizer mother liquor 48 are metered into a digester 10. Preferably, a chemical grade soda ash is used because it has fewer and lower impurities than crude or commercial grade soda ash. Also, the mother liquor 54 from the crystal separator 18 is recycled to the digester 10. The soda ash and mother liquor are mixed in a series of reaction tanks, preferably two tanks, to better react with the soda ash. The mother liquor preferably contains an aqueous solution of about 45.1 wt % sodium bisulfite at about 95° F. before being heated and introduced into the digester 10. Depending on the temperature of the aqueous solution, which may be between about 55° F. and about 115° F., the concentration of sodium bisulfite may be between about 42.4 and about 46.5 wt %. Preferably, the mother liquor is substantially saturated with sodium bisulfite. (The solubilities and concentrations of the inorganic compounds used herein are based, in part, upon values noted in A. Seidell, *Solubilities of Inorganic and Metal Organic Compounds*, D. Norstrand Co., New York 1953.)

In the digester 10, the soda ash reacts with sodium bisulfite forming carbon dioxide gas and a slurry of sodium sulfite. Preferably, the slurry has about 3.0 wt % sodium sulfite suspended solids in an aqueous solution of about 39.8 wt % sodium bisulfite and about 4.0 wt % sodium sulfite. The suspended solids content of the slurry may be between about 4.0 wt % and about 0.0 wt %. In the solution, the concentration of sodium bisulfite may be between about 36.5 and about 40.6 wt %. The concentration of sodium sulfite may be between about 3.0 and about 6.0 wt %. Preferably, the pH of this solution is approximately 5.2. The exothermic heat of this reaction in the digester 10 increases the solution temperature by about 3° F. to 7° F. The carbon dioxide produced in this reaction is taken off via line 32 to a scrubber. Some of the bottoms 36 from the absorber 14 may be recirculated with the feed liquor to the absorber.

The feed liquor 38 is fed to the top of a packed bed absorption tower 14 where it counter-currently contacts sulfur dioxide containing gas. The sulfur dioxide containing gas 40 is generated in a sulfur burner and contains about 16 to 19 volume % sulfur dioxide at about 120° F. Preferably, the sulfur dioxide is fed to the absorber at a pressure of 16.7 psia. This pressure may be between about 10 and 40 psia. The sulfur dioxide reacts with both solid sodium sulfite, if present, and dissolved sodium sulfite to produce a reaction liquor concentration of approximately 48.4 wt % sodium bisulfite, which preferably is substantially at or close to saturation. Depending on operating conditions, this concentration may be between about 44 wt % and about 50 wt %. The exothermic reaction of sodium sulfite and sulfur dioxide increases the temperature of the reaction liquor 44 leaving the tower to between about 100° F. and about 160° F., preferably to 140° F. This increased temperature raises the solubility of sodium metabisulfite in the reaction liquor and keeps any sodium metabisulfite from crystallizing until the liquor is cooled in the crystallizer.

The $SO_2$ concentration in the gas feed 40 and the operating pressure of the absorber 14 allow approximately 0.1 to 0.5 wt %, preferably, about, 0.3 wt %, of unreacted sulfur dioxide gas to be dissolved into the reaction liquor 44 leaving the absorption tower. The dissolved sulfur dioxide lowers the pH of this solution to between about 3.6 to 4.1, preferably, about 3.8, rather than a pH of about 4.2 for a solution without excess unreacted sulfur dioxide. The absorber tower off gas 42, which contains sulfur dioxide and other gases (e.g., $O_2$ and $N_2$) not absorbed by the reaction liquor, is sent to a scrubbing system (not shown). The scrubbing system may convert the sulfur dioxide into sodium sulfite that can be separated and sold.

The reaction liquor 44 passes through a filter (not shown), or settling tank, to remove insoluble matter from the soda ash feed and any unreacted soda ash and sodium sulfite particles. These solid particles can have a deleterious effect on the crystallization of sodium metabisulfite, in regard to crystal size, strength and impurities. It is important to maintain consistent concentrations in the reaction liquor. For example, changes in the sodium sulfite concentration may cause corresponding changes in the sodium metabisulfite solubility that can result in production of fines in the crystallizer. By introducing soda ash and sulfur dioxide into separate vessels, better control of the reactions may be obtained to produce more consistent feed to the crystallizer. Some of the reaction liquor 36 is recycled back to the digester 12, and some of the reaction liquor 44 is sent to a crystallizer.

Crystallization

After filtration, the solution 44 is fed to a reactive cooling crystallizer 16. The solution is cooled to between about 95° F. and 115° F., preferably about 95° F. The cooling crystallizer uses cooling water 50 in an external-circulation heat exchanger to reduce, preferably, the solubility of sodium metabisulfite to approximately 41.2 wt %. Depending upon operating conditions, the solubility may vary between about 38.7 and about 42.4 wt %. The cooling results in a supersaturated solution that causes the sodium metabisulfite to precipitate on existing crystals in the slurry portion of the crystallizer. The difference in solubility of sodium metabisulfite at 140° F. (i.e., 44.2 wt %) and at 95° F. (i.e., 41.2 wt %) forces crystallization.

Mother liquor is preferentially removed from the slurry in the crystallizer through a baffled settling crystallizer section to increase the slurry percent solids to between about 25 and about 45 wt %, preferably, about 35 wt %. The mother liquor 48 is recycled back to the digester 10. The mother liquor may first pass through a heat exchanger 12 to raise its temperature, preferably, up to about 133° F. before being fed to the digester 10. However, depending upon operating desires this temperature may be between about 65° F. and 155° F. Hot water may be supplied via line 60 to provide the needed process heat.

Caustic soda at about 50% concentration is fed via line 46 into the crystallizer cooler. Preferably, the caustic soda enters the circulation loop at a point just after the crystallizer feed addition. Alternatively, the caustic soda may be injected at the liquid surface in the crystallizer. The caustic soda reacts with the dissolved sulfur dioxide, which is preferably about 0.3 wt %, coming in with the crystallizer feed to produce sodium bisulfite. This sodium bisulfite formed increases the solution supersaturation and consequently increases crystallizer yield of sodium metabisulfite.

Considering the effect of the small solubility differences in sodium metabisulfite between the reaction liquor and mother liquor, the theoretical percent crystal yield per pass is 10.9% of the $Na_2S_2O_5$ fed to the crystallizer 16. With the dissolved sulfur dioxide in the feed and caustic addition, the crystallizer yield increases to 12.0% of the $Na_2S_2O_5$ fed to the crystallizer per pass. This scheme, therefore, is believed to increase the yield per pass by about 10 to 15% over a scheme feeding the crystallizer only a near-saturated sodium bisulfite solution without dissolved sulfur dioxide.

Alternately, a side stream of crystallizer mother liquor could be withdrawn into a crystallization reactor vessel (not shown) to which the caustic soda would be added. The caustic soda would react with a portion of the sodium bisulfite in solution forming sodium sulfite. The reacted mother liquor would be heated to the point that all solids are dissolved and re-injected into the crystallizer where the sodium sulfite would react further with the dissolved sulfur dioxide in the crystallizer feed to produce sodium metabisulfite. This scheme would have the same beneficial effect of increased yield as direct injection of caustic soda into the crystallizer without the attendant problems associated with direct caustic injection, such as localized supersaturation and fines production.

Alternatively, the caustic soda could be added to the surface of the crystallizer slurry.

Another beneficial effect from introducing caustic soda into the crystallizer is the ability to directly control the pH of the solution in the crystallizer. Caustic soda increases the pH which changes the nucleation point and modifies the fines crystal habit. Preferably, the pH is increased and maintained at about 4.0. Also, changes in composition of the feed to the crystallizer can be compensated for by regulating the addition of caustic thereby improving the conditions for sodium metabisulfite crystal growth.

The slurry 52 from the crystallizer 16 is fed to a separator 18. Preferably, the separator is a pusher centrifuge. The centrate 54, or mother liquor, separated from the crystals is recycled to the digester 10. The sodium metabisulfite crystals 56 are fed to a co-current direct fired gas heated dryer. The dryer is operated to minimize decomposition of the sodium metabisulfite to produce at least about 980% pure sodium metabisulfite.

Crystals produced in this manner will have no apparent sulfur dioxide smell and have a particle size distribution of at least about 70 wt % greater than 100 mesh.

Alternatively, the above process can be operated at different design conditions. For example, Table 1 below provides alternate process design parameters calculated for a few of the major streams associated with the above described process.

TABLE 1

| Concentration | Digester Tank | Crystallizer Feed | Crystallizer Mother Liquor |
|---|---|---|---|
| $NaHSO_3$, wt % | 40.20 | 45.48 | 43.88 |
| $Na_2SO_3$, wt % | 4.00 | 0.00 | 0.00 |
| $H_2O$, wt % | 55.80 | 54.14 | 56.12 |
| $H_2SO_3$ wt % | 0.00 | 0.38 | 0.00 |

TABLE 1-continued

| Concentration | Digester Tank | Crystallizer Feed | Crystallizer Mother Liquor |
|---|---|---|---|
| Temperature, degrees F. | 89.7 | 105.0 | 77.0 |
| pH | 5.4 | 3.8 | 4.0 |

Figure 2:
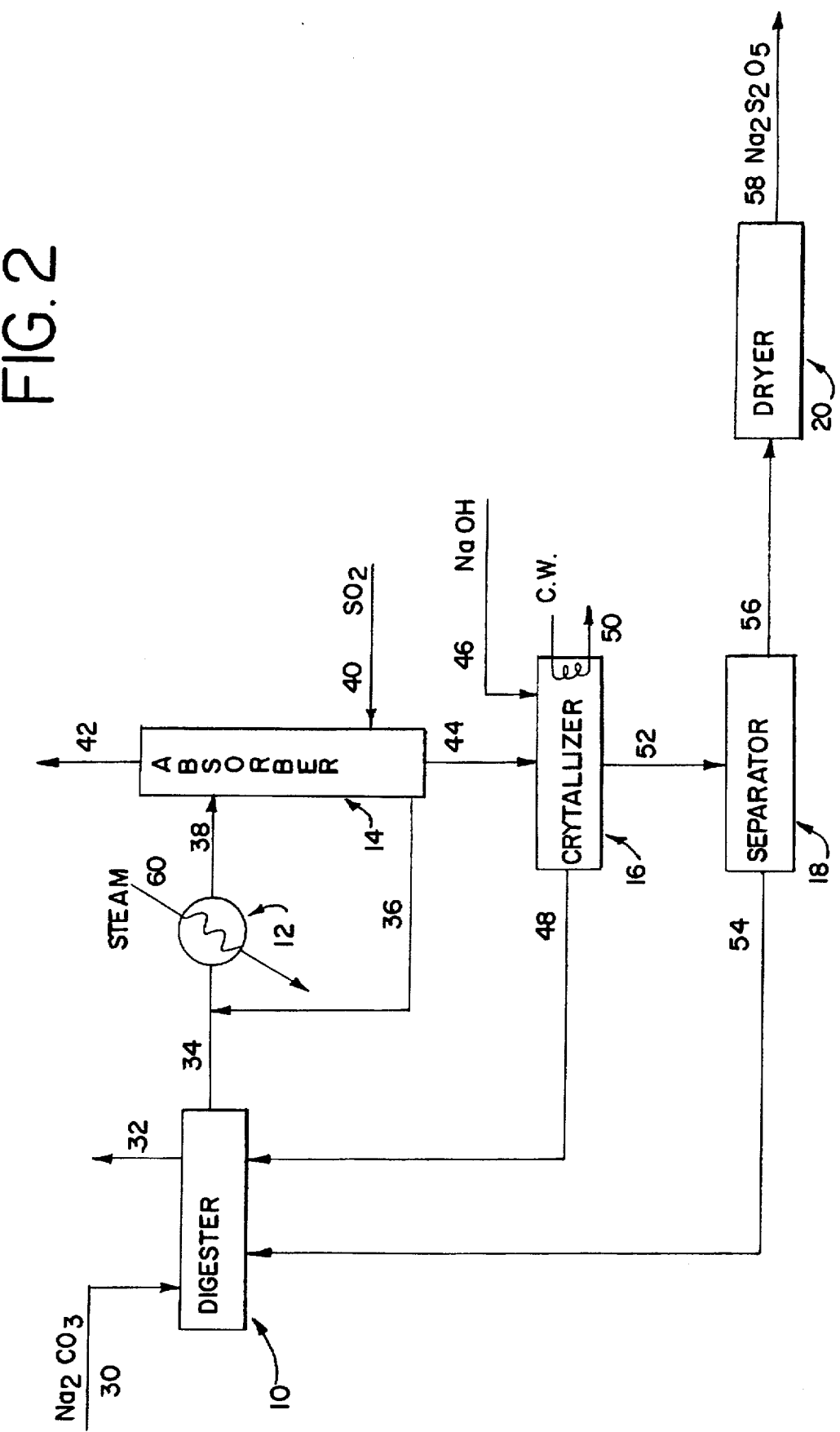
FIG. 2 depicts a flow diagram of an alternate embodiment of the process.

FIG. 2 shows an alternate embodiment for the process of this invention. In this embodiment, the mother liquor recycle 48 is not heated prior to feeding to the digester 10. Rather, the aqueous feed liquor 34 from the digester 10 is heated. The feed liquor 34 is passed through heat exchanger 12 to raise the temperature by about 5° F. to 20° F. In addition, it is preferred to recirculate absorber bottoms with the feed liquor to provide additional heat to raise the temperature and sodium sulfite solubility before the feed liquor is passed through the heat exchanger 12.

Table 2 below includes a calculated, more detailed material balance showing the major streams for another embodiment of this invention utilizing the flow scheme illustrated in FIG. 1. Table 3 below includes a calculated, more detailed material balance of still another embodiment of this invention utilizing the flow scheme illustrated on FIG. 2. The calculated material balances of Tables 2 and 3 are based on production levels of about 12,000 ton per year sodium metabisulfite. These material balances show some of the operating conditions at which this process is believed to be capable of operating. However, taking into the practical considerations of the design and operation of a commercial production facility based on these calculations, it is believed that the operating conditions represented in Table 2 are preferable to the conditions represented in Table 3.

TABLE 2

| | Components | STREAM NO. | | | | | | | | | | |
|---|---|---|---|---|---|---|---|---|---|---|---|---|
| | | 30 | 32 | 38 | 40 | 42 | 44 | 46 | 48 | 52 | 54 | 56 |
| FLOW RATE (T.P.H.) | $NaHSO_3$ | | | 21.55 | | | 12.04 | | 9.47 | 1.17 | 1.12 | 0.045 |
| | $Na_2SO_3$ | | | 1.54 | | | | | | | | |
| | $Na_2S_2O_5$ | | | | | | | | | 1.40 | 0.08 | 1.319 |
| | $H_2O$ | | 0.080 | 25.81 | 0.487 | 0.565 | 12.76 | 0.05 | 11.51 | 1.42 | 1.37 | 0.055 |
| | $SO_2$ | | 0.013 | | 1.827 | 0.898 | 0.075 | | | | | |
| | $CO_2$ | | 0.289 | | | | | | | | | |
| | $Na_2CO_3$ | 0.697 | | | | | | | | | | |
| | NaOH | | | | | | | 0.05 | | | | |
| | Other | | 0.360 (AIR) | | 3.7 (AIR) | 3.7 (AIR) | | | | | | |
| | TOTAL | 0.697 | 0.761 | 48.89 | 6.02 | 5.17 | 24.87 | 0.10 | 20.98 | 3.99 | 2.57 | 1.419 |
| | TEMP (°F.) | 200 | 120 | 137 | 120 | 137 | 140 | 120 | 95 | 95 | 95 | 95 |

TABLE 3

| | Components | STREAM NO. | | | | | | | | | | | |
|---|---|---|---|---|---|---|---|---|---|---|---|---|---|
| | | 30 | 32 | 38 | 40 | 42 | 44 | 46 | 48 | 52 | 54 | 56 | 58 |
| FLOW RATE (T.P.H.) | $NaHSO_3$ | | | 22.26 | | | 12.66 | | 10.16 | 1.10 | 1.06 | 0.041 | |
| | $Na_2SO_3$ | | | 1.86 | | | | | | | | | 0.013 |
| | $Na_2S_2O_5$ | | | | | | | | | 1.40 | 0.08 | 1.325 | 1.331 |
| | $H_2O$ | | 0.007 | 30.04 | 0.598 | 0.144 | 15.11 | 0.05 | 13.8 | 1.50 | 1.44 | 0.055 | |

TABLE 3-continued

| Components | STREAM NO. | | | | | | | | | | | |
|---|---|---|---|---|---|---|---|---|---|---|---|---|
| | 30 | 32 | 38 | 40 | 42 | 44 | 46 | 48 | 52 | 54 | 56 | 58 |
| $SO_2$ | | 0.001 | | 2.25 | 1.14 | 0.084 | | | | | | |
| $CO_2$ | | 0.364 | | | | | | | | | | |
| $Na_2CO_3$ | 0.876 | | | | | | | | | | | |
| NaOH | | | | | | | 0.05 | | | | | |
| Other | | 0.360 | | 4.55 | 4.55 | | | | | | | |
| | | (AIR) | | (AIR) | (AIR) | | | | | | | |
| TOTAL | 0.876 | 0.732 | 54.15 | 7.40 | 5.83 | 27.86 | 0.10 | 23.96 | 4.00 | 2.58 | 1.42 | 1.394 |
| TEMP (°F.) | 200 | 200 | 87 | 120 | 87 | 105 | 120 | 55 | 55 | 55 | 55 | 195 |

EXAMPLE

In a pilot plant study, a solution of about 42% by weight sodium bisulfite was prepared by dissolving sodium sulfite in water and reacting it with sufficient sulfur dioxide. The solution was heated to between 150° and 170° F. in an absorber and additional sodium sulfite and sulfur dioxide were added to maintain a pH between 3.5 and 3.7. This solution, which contained about 45% sodium bisulfite, was fed to a crystallizer and cooled to about 95° F. Caustic soda was added to the liquor in the crystallizer external circulation loop and returned to the crystallizer to react with the sulfur dioxide present and maintain the pH in the crystallizer between about 3.8 and 4.1. The slurry solids loading in the crystallizer was between about 400 and 500 g/l. The slurry of sodium metabisulfite crystals was discharged to a slurry thickening tank and periodically centrifuged. The crystals were sent to a rotary dryer set up for co-current drying.

The sodium metabisulfite product was analyzed and generally had between about 98.2 and 98.8% purity. The product size distribution was generally 80% to 95% by weight larger than 100 mesh, sometimes with about 80% by weight larger than 70 mesh. Contrary to expectations, the introduction of caustic into the crystallizer did not appear to cause excessive nucleation and fines production.

Particle size distribution was not dependent on retention time in the crystallizer. Rather, the coarser particle size was dependent on the slurry density in the crystallizer discharge. A distribution of at least 70 wt % greater than 100 mesh was achieved with a slurry density of about 300 g/l. A distribution of at least 80 wt % greater than 100 mesh was achieved with a slurry density of about 400 g/l.

It should be appreciated that the examples and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A process for manufacturing sodium metabisulfite comprising:

introducing soda ash into an aqueous solution of sodium bisulfite to form a feed liquor of sodium bisulfite and sodium sulfite;

then introducing sulfur dioxide into the feed liquor and converting sodium sulfite to sodium bisulfite to form a reaction liquor having dissolved sulfur dioxide;

then introducing caustic soda into the reaction liquor to react with dissolved sulfur dioxide to form sodium bisulfite;

cooling the reaction liquor to precipitate sodium metabisulfite from the reaction liquor and form a mother liquor, and separating sodium metabisulfite from the mother liquor and recycling the liquor.

2. The process of claim 1 wherein the feed liquor includes between about 36% and about 41% by weight sodium bisulfite and between about 3% and about 6% by weight sodium sulfite in solution.

3. The process of claim 1 wherein the reaction liquor has a pH between about 3.5 and about 4.2 before introducing caustic soda.

4. The process of claim 3 wherein the reaction liquor has a pH between about 3.6 and about 3.8 before introducing caustic soda.

5. The process of claim 1 wherein the reaction liquor includes between about 44% and about 50% by weight sodium bisulfite.

6. The process of claim 1 wherein the reaction liquor includes between about 0.1% and about 0.5% by weight sulfur dioxide.

7. The process of claim 1 wherein the temperature of the reaction liquor before cooling is between about 100° F. and about 160° F.

8. The process of claim 1 wherein the reaction liquor is cooled to between about 50° F and about 115° F.

9. The process of claim 8 wherein the reaction liquor is cooled to about 95° F.

10. The process of claim 1 wherein said caustic soda is introduced into the reaction liquor while it is being cooled.

11. The process of claim 1 wherein each of the soda ash, sulfur dioxide and caustic soda are introduced into the respective liquors in separate vessels.

12. An improved process for the manufacture of sodium metabisulfite comprising:

in a contacting tower, providing a solution comprising sodium bisulfite at a substantially saturated concentration and dissolved sulfur dioxide, said solution having a pH from about 3.5 to about 4.2 and a temperature between about 100° F. and 160° F.;

in a separate vessel, introducing the solution and adding at least sufficient amounts of sodium hydroxide to react with substantially all of the sulfur dioxide in the solution, and crystallizing sodium metabisulfite from the solution at a temperature between about 50° F. and about 115° F.

13. The process of claim 12 further comprising feeding the mother liquor remaining after crystallization to a digestion tank and introducing sodium carbonate to react with sodium bisulfite in the mother liquor to produce sodium sulfite.

14. The process of claim 13 further comprising feeding the solution of the digestion tank into said contacting tower.

15. The process of claim 12 wherein the solution produced in the contacting tower has a pH between about 3.6 and about 3.8.

16. The process of claim 15 wherein an amount of sodium hydroxide is added to maintain a pH of about 4.0.

17. The process of claim 12 wherein the sodium metabisulfite is crystallized at a temperature of about 75° F.

18. The process of claim 12 wherein the solution produced in the contacting tower has about 0.3 weight percent sulfur dioxide.

19. In a process for the manufacture of sodium metabisulfite wherein a solution of sodium bisulfite close to saturation is formed in a first vessel, the solution is cooled in a second vessel to crystallize sodium metabisulfite and the sodium metabisulfite is recovered, the improvement comprising introducing sodium hydroxide into the second vessel to form additional sodium metabisulfite therein.

20. In the process of claim 19, the improvement further comprising feeding the mother liquor remaining after the crystallization step to a third vessel and introducing soda ash into the third vessel.

21. The process of claim 12 wherein the solution in the contacting tower has a sulfur dioxide concentration of between about 44 wt. % and about 50 wt. %.

* * * * *